(12) United States Patent
Kurz et al.

(10) Patent No.: US 12,212,049 B2
(45) Date of Patent: Jan. 28, 2025

(54) RADAR ANTENNA ARRANGEMENT FOR A VEHICLE, COMPRISING AT LEAST ONE VEHICLE COMPONENT, AND VEHICLE

(71) Applicants: Volkswagen Aktiengesellschaft, Wolfsburg (DE); AUDI AG, Ingolstaft (DE); Sicoya GmbH, Berlin (DE)

(72) Inventors: Heiko Kurz, Hannover (DE); Thorsten Bagdonat, Braunschweig (DE); Michael Schwenkert, Ingolstadt (DE); Christoph Scheytt, Dorsten (DE); Hanjo Rhee, Berlin (DE); Thomas Schneider, Michendorf (DE); Joerg Schoebel, Braunschweig (DE); Fabian Schwartau, Braunschweig (DE); Stefan Preussler, Braunschweig (DE)

(73) Assignees: VOLKSWAGEN AKTIENGESELLSCHAFT, Wolfsburg (DE); AUDI AG, Ingolstadt (DE); SICOYA GMBH, Berlin (DE)

( * ) Notice: Subject to any disclaimer, the term of this patent is extended or adjusted under 35 U.S.C. 154(b) by 448 days.

(21) Appl. No.: 17/616,611

(22) PCT Filed: May 26, 2020

(86) PCT No.: PCT/EP2020/064570
§ 371 (c)(1),
(2) Date: Dec. 3, 2021

(87) PCT Pub. No.: WO2020/244967
PCT Pub. Date: Dec. 10, 2020

(65) Prior Publication Data
US 2022/0231406 A1    Jul. 21, 2022

(30) Foreign Application Priority Data
Jun. 3, 2019    (DE) ..................... 10 2019 114 876.6

(51) Int. Cl.
*H01Q 1/32*    (2006.01)
*G01S 7/40*    (2006.01)
(Continued)

(52) U.S. Cl.
CPC ......... *H01Q 1/3233* (2013.01); *G01S 7/4004* (2013.01); *G01S 13/931* (2013.01);
(Continued)

(58) Field of Classification Search
CPC .... H01Q 1/3233; H01Q 21/00; H01Q 1/1271; H01Q 21/061; H01Q 1/32; G01S 7/4004;
(Continued)

(56) References Cited

U.S. PATENT DOCUMENTS 4,552,456 A * 11/1985 Endo ...................... G01S 17/58
356/28.5
5,760,744 A    6/1998 Sauer et al. ........... 343/700 MS
(Continued)

FOREIGN PATENT DOCUMENTS

DE    102006007150 A1 *  2/2007   ......... B62D 15/0285
DE    112008001232 T5     4/2010   ............. B60R 21/00
(Continued)

OTHER PUBLICATIONS

International Search Report and Written Opinion, Application No. PCT/EP2020/064570, 7 pages, Aug. 24, 2020.
(Continued)

*Primary Examiner* — Timothy A Brainard
*Assistant Examiner* — Ismaaeel A. Siddiquee
(74) *Attorney, Agent, or Firm* — Slayden Grubert Beard PLLC (57) ABSTRACT

The invention relates to a radar antenna arrangement (1) for a vehicle (2), comprising at least one vehicle component (3), wherein the radar antenna arrangement (1) comprises a plurality of radar devices (4) which are configured to trans-
(Continued)

mit and/or receive a radar beam (12). The radar devices (4) are arranged on a component surface (5) of the vehicle component (3). The invention provides for the radar antenna arrangement (1) to comprise at least one antenna row (6) for determining an azimuthal angle (10) of the radar beam (12), said antenna row comprising a plurality of the radar devices (4). Directly adjacent radar devices (4) have respective horizontal distances (8) from one another. The radar antenna arrangement (1) comprises at least one antenna column (7) for determining an elevation angle (11) of the radar beam (12), said antenna column comprising a plurality of the radar devices (4). Directly adjacent radar devices (4) have respective vertical distances (9) from one another. The at least one antenna row (6) and the at least one antenna column (7) include an angle α of between 5 degrees and 180 degrees.

14 Claims, 5 Drawing Sheets

(51) Int. Cl.
  *G01S 13/931* (2020.01)
  *H01Q 21/00* (2006.01)
  *H01Q 1/12* (2006.01)
  *H01Q 21/06* (2006.01)

(52) U.S. Cl.
  CPC ...... *H01Q 21/00* (2013.01); *G01S 2013/9327* (2020.01); *G01S 2013/93274* (2020.01); *G01S 2013/93276* (2020.01); *H01Q 1/1271* (2013.01); *H01Q 1/32* (2013.01); *H01Q 21/061* (2013.01)

(58) Field of Classification Search
  CPC ......... G01S 13/931; G01S 2013/93274; G01S 2013/93276; G01S 2013/9327
  See application file for complete search history.

(56) References Cited

U.S. PATENT DOCUMENTS

| | | | |
|---|---|---|---|
| 6,271,798 B1 | 8/2001 | Endo et al. | 343/713 |
| 6,580,497 B1* | 6/2003 | Asaka | G01S 7/493 |
| | | | 356/28.5 |
| 9,310,478 B2 | 4/2016 | Gross et al. | |
| 9,739,881 B1 | 8/2017 | Pavek et al. | |
| 9,869,762 B1* | 1/2018 | Alland | H01Q 21/08 |
| 10,322,566 B2 | 6/2019 | Kamo | |
| 11,500,059 B2 | 11/2022 | Kambe et al. | |
| 11,555,917 B2 | 1/2023 | Maruyama et al. | |
| 2002/0111149 A1 | 8/2002 | Shoki | 455/277.1 |
| 2008/0204322 A1 | 8/2008 | Oswald et al. | 342/465 |
| 2008/0224916 A1 | 9/2008 | Takagi | 342/91 |
| 2008/0272955 A1 | 11/2008 | Yonak et al. | 342/54 |
| 2012/0223852 A1* | 9/2012 | Gross | H01Q 21/22 |
| | | | 342/175 |
| 2016/0093944 A1* | 3/2016 | Kamo | G01S 7/032 |
| | | | 348/148 |
| 2018/0037006 A1 | 2/2018 | Droste et al. | |
| 2018/0372850 A1 | 12/2018 | Frederiksen et al. | |
| 2019/0148821 A1* | 5/2019 | Talty | H01Q 1/325 |
| | | | 343/713 |
| 2020/0096626 A1* | 3/2020 | Wang | G01S 13/4454 |
| 2021/0288398 A1 | 9/2021 | Sato et al. | |

FOREIGN PATENT DOCUMENTS

| | | | | |
|---|---|---|---|---|
| DE | 102014220431 A1 * | 4/2016 | | B60S 1/56 |
| DE | 102016210771 B3 * | 10/2017 | | |
| DE | 102016005620 A1 * | 11/2017 | | G01S 13/42 |
| DE | 102016217134 A1 | 3/2018 | | B60R 16/02 |
| DE | 102017210684 A1 * | 12/2018 | | G01S 17/42 |
| JP | H09-502073 | 2/1997 | | B32B 17/10 |
| JP | 2000156606 A | 6/2000 | | B60W 30/00 |
| JP | 2002237779 A | 8/2002 | | H01Q 1/32 |
| JP | 2003344535 A | 12/2003 | | G01S 13/93 |
| JP | 2007518968 A | 7/2007 | | G01S 13/02 |
| JP | 2008224511 A | 9/2008 | | G01S 13/931 |
| JP | 2009036576 A | 2/2009 | | G01S 13/10 |
| JP | 2010158035 A | 7/2010 | | B60R 11/02 |
| JP | 2010216885 A | 9/2010 | | G01R 29/10 |
| JP | 2013504764 A | 2/2013 | | G01S 13/931 |
| JP | 2016163216 A | 9/2016 | | H01Q 23/00 |
| JP | 2017129419 A | 7/2017 | | B60J 1/00 |
| JP | 2017147487 A | 8/2017 | | B60R 19/48 |
| JP | 2017181480 A | 10/2017 | | G01S 13/93 |
| JP | 2019009712 A | 1/2019 | | H01Q 1/22 |
| JP | 2019009713 A | 1/2019 | | B60R 11/02 |
| WO | 2016/162251 A1 | 10/2016 | | H01Q 1/12 |
| WO | 2017/165728 A1 | 9/2017 | | G01S 13/86 |
| WO | 2018/046353 A1 | 3/2018 | | G01S 13/42 |
| WO | 2018/122926 A1 | 7/2018 | | G01S 13/93 |
| WO | 2019/012741 A1 | 1/2019 | | G01S 13/931 |
| WO | 2020/244967 A1 | 12/2020 | | G01S 13/931 |

OTHER PUBLICATIONS

Japanese Office Action, Application No. 2021571731, 8 pages, Nov. 29, 2023.
Korean Office Action, Application No. 20217043000, 5 pages, Aug. 30, 2024.
Chinese Office Action, Application No. 202080041302.7, 7 pages, Sep. 11, 2024.

* cited by examiner

RADAR ANTENNA ARRANGEMENT FOR A VEHICLE, COMPRISING AT LEAST ONE VEHICLE COMPONENT, AND VEHICLE

CROSS-REFERENCE TO RELATED APPLICATIONS

This application claims priority to German Patent Application No. DE 10 2019 114 876.6, filed on Jun. 3, 2019 with the German Patent and Trademark Office. The contents of the aforesaid Patent Application are incorporated herein for all purposes.

TECHNICAL FIELD

The invention relates to a radar antenna arrangement for a vehicle comprising at least one vehicle component. The invention also relates to a vehicle with a radar antenna arrangement and to a method for calibrating a radar antenna arrangement.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

For capturing an environment of a vehicle, in particular in an autonomous drive operation of the vehicle or in use of sophisticated driver assistance systems, it is required to capture the entire environment of the vehicle by sensors, by means of radar, lidar or a camera. Therein, a capture of an angular range of 360 degrees around the vehicle is required such that all of the static and dynamic objects are captured. Herein, it additionally depends on also determining a distance of an object besides a direction. In this case, one speaks of a so-called three-dimensional environmental capture. In order to be able to achieve a required angular resolution, LIDAR sensors are in particular used for this purpose. It is beneficial in LIDAR sensors that they combine ranging with a high angular resolution. It is problematic in a 360 degree environmental capture around a vehicle by means of lidar that a plurality of small individual sensors is required, which comprise respective light sources and detector elements. Alternatively thereto, there are larger sensors, but which have larger dimensions such that the choice of the installation positions at a vehicle is restricted. This problem in particular gains in importance if an inconspicuous installation at the vehicle is desired.

In processing the measurement data of the individual LIDAR sensors, there is the problem that the individual LIDAR sensors have to individually capture and process their measurement data. In a subsequent step, the processed measurement data has to be fused for creating the environment. In the fusion of the individual measurement data, an accurate timestamp is in particular required in real-time processing. In the employment of the LIDAR sensors, the disadvantage arises that the accuracy and operability thereof depend on the current visibility conditions. In particular in case of fog, snow or in dark lighting conditions, an impairment of the accuracy occurs. A similar difficulty related to the visibility conditions arises in the use of cameras for capturing the environment. In contrast thereto, the environmental capture by means of radar is not affected by visibility conditions. The disadvantage of an environmental capture by means of radar sensors is in providing a suitable radar arrangement. Capturing an angular range with a sufficient resolution requires providing an array antenna with a sufficiently large surface. The array antenna, which is also referred to as antenna array, comprises a plurality of individual sensors for transmitting and/or receiving radar beams. Via the adjustment or determination of a phase relation of the radar beams transmitted or received by the individual antennas, the direction of the radar beams to be transmitted or received may be determined. In evaluating the measurement data of the radar sensors, the problem arises that the individual sensors have to be synchronized with each other to be able to determine the phase differences between the individual received radar beams. It is disadvantageous in the known prior art that radar arrangements have an angular separability in azimuth of 10 degrees to 4 degrees. The angular separability in elevation is usually lower such that imaging methods for radar data cannot be used to achieve a requested accuracy for autonomous vehicles. In comparison, LIDAR systems have an angular separability in the range of 0.1 degrees.

Known radar sensors for vehicles according to the prior art have dimensions of ca. 10 cm×10 cm and allow a maximum angular resolution of ca. 2 degrees without allowing three-dimensional environmental capture. In contrast, so-called nanoradars have dimensions in the range of 5 cm×5 cm and may be easier integrated in the vehicle by their compact construction. For increasing the resolution power, the so-called synthetic aperture method may be applied to further increase the resolution. In evaluating the measurement data in the individual sensors, the difficulty of temporal synchronization arises as in case of the LIDAR sensors. For merging the measurement data, it is required that the timestamps coincide to be able to create an overall image of the environment. Nanoradars are restricted in their range to ca. 45 m according to the current prior art. The applied synthetic aperture method is only possible perpendicular to the direction of travel. A foresight in or opposite to the direction of travel is not possible with this method. In addition, data processing required after the measurement is very computationally intensive. Generally, the problem arises that a plurality of sensors is required and the radar arrangement requires dimensions, which may be provided at a vehicle only to restricted extent, for providing a required accuracy.

SUMMARY

A need exists to allow environmental capture by means of radar for a vehicle with higher accuracy. Embodiments of the invention are described in the dependent claims, the following description, and the drawings.

DESCRIPTION

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a radar antenna arrangement for a vehicle comprising at least one vehicle component is provided. The radar antenna arrangement comprises multiple radar devices, which are configured to transmit and/or receive a radar beam. The radar devices are arranged on a component surface of the vehicle component. The radar antenna arrangement comprises at least one antenna row for determining an azimuthal angle of the radar beam, which comprises multiple of the radar devices. Multiple of the radar devices are arranged along the antenna row, wherein directly adjacent radar devices have respective horizontal distances to each other. The radar antenna arrangement additionally comprises at least one antenna column for determining an elevation angle of the radar beam. Multiple of the radar devices are arranged along the antenna column, wherein directly adjacent radar devices have respective vertical distances to each other. The at least one antenna row and the at least one antenna column include an angle of 5 degrees to 180 degrees.

In other words, a radar antenna arrangement is provided, which is provided for at least one vehicle component. The radar antenna arrangement is an antenna array, which forms a so-called array by the at least one antenna row and the at least one antenna column in a plane, which is located in a component surface of the vehicle component. The at least one antenna column and the at least one antenna row form an internal angle α of 5 degrees to 180 degrees. Multiple radar devices are arranged in the component surface. The radar devices are configured to receive and/or transmit radar beams. Multiple radar devices are arranged within the at least one antenna column and the at least one antenna row, wherein the directly adjacent radar devices have respective distances to each other. The vertical and the horizontal distances may be identical or different. For example, the distances may be integer multiples of a predetermined half radar wavelength. It may be provided that the antenna devices arranged in the antenna column are provided to capture an elevation angle of a received radar beam or to define the elevation angle of a radar beam to be transmitted. The antenna row may be configured to capture an azimuthal angle of a radar beam or to define an azimuthal angle of a radar beam to be transmitted. The component surface of the vehicle component may be used as a surface for the radar antenna arrangement. In particular, it may be provided to use larger vehicle components like doors or windows for providing the component surface. Hereby, a surface of a present component of the vehicle may be used for the radar devices without an additional element having to be arranged for providing the surface on a vehicle.

Further optional embodiments are discussed herein, by which further benefits arise.

Some embodiments provide that the at least one antenna row and the at least one antenna column include an angle of 60 degrees to 120 degrees. In other words, the at least one antenna row and the at least one antenna column span an angle of 60 degrees to 120 degrees. For example, it may be provided that the at least one antenna row and the at least one antenna column include an angle of 90 degrees.

Some embodiments provide that the respective horizontal distances and the respective vertical distances of the radar devices are an integer multiple of a predetermined radar wavelength, wherein the radar wavelength is between 0.011 m and 0.014 m or 0.0037 to 0.0038 m. In other words, directly adjacent radar devices in the antenna column and/or the antenna row have a multiple of half the wavelength of a radar wavelength as the distance. Therein, the wavelengths correspond to those, which are used in a spectrum of 24.05 GHz to 24.25 GHz or 21.65 GHz to 26.65 GHz or 77 GHz to 81 GHz. Thereby, a benefit arises that a constructive interference of signals of the respective received partial beams of the radar beam is allowed.

Some embodiments provide that the radar devices are arranged in a sparse array arrangement. In other words, it is a not fully occupied antenna array, in which the respective vertical distances and the respective horizontal distances are not identical. Thus, individual positions are not occupied with radar devices along the at least one radar row and/or the at least one radar column. Thereby, the benefit arises that the number of the radar devices and thus the amount of the measurement data to be evaluated is reduced. By means of a simulation of a far field of the radar beams for a respective radar antenna arrangement, herein, saving of radar devices without significant resolution losses may be allowed. A sparse array arrangement is an underoccupied, in other words not completely occupied, antenna arrangement with radar devices with individual distances, which are greater than λ/2. In other words, the individual positions, which have a distance of λ/2 to a directly adjacent radar device, are unoccupied, i.e. there is no radar device at them.

Some embodiments provide that the radar antenna arrangement comprises at least one optical guide, wherein the radar devices are connected to a control unit of the radar antenna arrangement via the at least one optical guide. The optical guide is configured to transfer optical signals between the control unit and the radar devices. In other words, it is provided that the radar devices are controlled by a control unit, wherein transmission of partial beams by respective radar devices is controlled by means of optical signals from the control unit. For transferring the optical signals, the control unit is connected to the radar devices by the at least one optical guide. If a partial beam of the radar beam is received by one of the radar devices, is it converted into an optical signal by the radar device and transferred to the control unit via the optical guide. The control unit may process the optical signals to reconstruct a received radar beam from the partial beams. Thereby, a benefit arises that processing of the respective partial beams of the radar beam in the respective radar devices is not required and thus a timestamp does not have to be provided by the radar devices. Thus, the evaluation of the measurement data may be centrally effected in the control unit. Thus, it is not required to synchronize the individual radar devices.

Some embodiments provide that the vehicle component is a window pane of a vehicle. In other words, the radar antenna arrangement includes the window pane as the vehicle component. Thereby, a benefit arises that the radar antenna arrangement comprises a vehicle component with a relatively large surface. For example, it may be provided that the individual radar devices are arranged on a window pane for a vehicle. For example, the radar devices may be arranged on a side of the window pane facing the vehicle interior and for example be positioned in the area of a black print. Herein, the radar devices may be connected to each other by the optical guides, which may be arranged on the window pane.

Some embodiments provide that the radar devices are arranged in the window pane. In other words, it is provided to arrange the radar devices within the window pane such that they are at least partially enclosed by the window pane. For example, it may be provided that the window pane is a multilayer pane, which is composed of multiple layers. Herein, the radar devices may be arranged between adjacent layers of the window pane. Thereby, a benefit arises that the radar devices are fixed in certain positions, which are affected by thermal fluctuations only to a low extent.

Some embodiments provide that the at least one optical guide is arranged in the window pane at least in sections. In other words, at least a subset of the at least one optical guide is enclosed by the window pane. For example, it may be provided that a glass fiber used as the optical guide is arranged between two layers of the window pane. It may also be provided that a recess in the window pane is filled with the optical guide to connect the radar devices on or in the pane.

Some embodiments provide that the vehicle component is an A-pillar, a B-pillar and/or a C-pillar for a vehicle. In other words, the radar device comprises an A-, B- or C-pillar. Thereby, a benefit arises that the radar devices may be arranged in an area, which is not visible for a driver.

Some embodiments provide that the vehicle component is an element of the vehicle body. In other words, it is provided that the radar antenna arrangement comprises a component of a body of the vehicle. For example, it may be provided that the radar devices are arranged on or in a front spoiler, a fender or a bumper of the vehicle. Thereby, a benefit arises that vehicle surfaces, which are facing in different directions, may be used. Thus, a 360 degree angular coverage may be allowed by multiple radar antenna arrangements of the vehicle.

Some developments provide that a principal radiation direction of at least one of the radar devices is oriented to an outer surface of the window pane at a Brewster angle. In other words, the at least one radar device is oriented such that a partial beam transmitted by the radar device in the principal radiation direction of the radar device impinges on the interface between the window pane and the air at a Brewster angle. Thereby, the benefit arises that polarized radar beams are emitted from the window pane and a portion of the radar radiation coupled into the window pane is minimized.

The teachings herein also include a method for calibrating a radar antenna arrangement. In the method, it is provided that a first one of the radar devices is controlled for emitting a predetermined partial beam by means of an optical signal by the control unit. The predetermined partial beam is transmitted by the first one of the radar devices. At least a part of the partial beam is reflected within the window pane such that it further propagates within the pane. The part of the partial beam reflected within the pane is received by a second one of the radar devices. An optical signal is transferred to the control unit by the second one of the radar devices. A distance between the first one and the second one of the radar devices is determined by the control unit. In other words, a relative position of the first one of the radar devices and the second one of the radar devices is determined by the control device. This is effected in that the control unit causes emission of the predetermined partial beam by the first one of the control units by means of the optical signal. The partial beam is emitted into the window pane by the first one of the radar devices. A part of the partial beam exits the window pane on the outer surface of the window pane. The remaining part of the partial beam may be reflected back into the window pane on the outer surface. By multiple reflections, the part of the partial beam may propagate within the window pane. The reflected partial beam may impinge on the second one of the radar devices and be captured by it. Thereupon, the second one of the radar devices transmits the optical signal to the control unit. Now, it may determine the distance between the two radar devices for example based on the phase position of the received partial beam. It may be provided that multiple of the radar devices are for example controlled by the control unit for emitting a respective partial beam. By means of an evaluation of the optical signals transmitted from the respective radar devices, the geometric relation between the individual radar devices in the radar antenna arrangement may be determined by the control unit.

The teachings herein also include a vehicle with at least one radar antenna arrangement. The vehicle may for example be a truck or a passenger car. It may be provided that the vehicle may for example comprise multiple of the radar antenna arrangements, wherein a range of 360 degrees may be covered in the plane around the vehicle.

Embodiments of the vehicle and of the method are possible, which may comprise the features that have been described in context of the embodiments of the radar antenna arrangement. For this reason, the corresponding embodiments of the vehicle and of the method are not again described here.

The teachings herein also include combinations of the features of the described embodiments.

Reference will now be made to the drawings in which the various elements of embodiments will be given numerical designations and in which further embodiments will be discussed.

In the exemplary embodiments described herein, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 1:
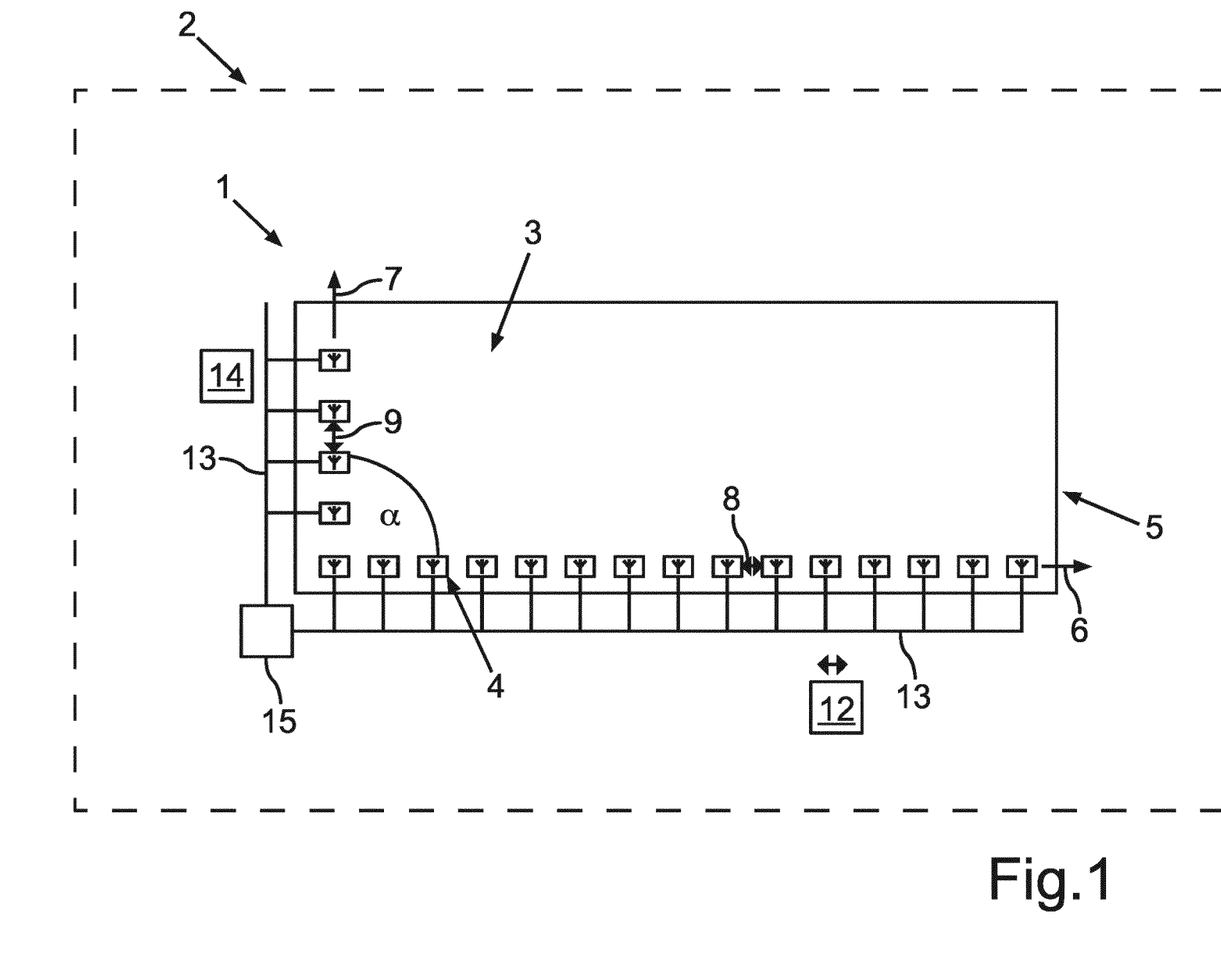
FIG. 1 shows an embodiment of a radar antenna arrangement.

FIG. 1 shows a radar antenna arrangement 1. The radar antenna arrangement 1 may be provided for a vehicle 2 and comprise at least one vehicle component 3. The radar antenna arrangement 1 may comprise multiple radar devices 4, which may be arranged on a component surface 5 of the component 3. The radar devices 4 may be arranged in at least one antenna row 6 and at least one antenna column 7. Respectively directly adjacent radar devices 4 may have respective horizontal distances 8 to each other in the at least one antenna row 6, adjacent radar devices 4 may have vertical distances 9 to each other in the antenna column 7, the at least one antenna column 6 may be provided for determining an azimuthal angle 10 of a radar beam 12. The at least one antenna column 7 may be provided for determining an elevation angle 11 of the radar beam 12. The individual radar devices 4 may be connected to a control unit 15 via an optical guide 13 for communicating optical signals 14. The individual radar devices 4 may be configured to create an optical signal 14 and transfer it to the control unit 15 for evaluation upon reception of a partial beam 12a of the radar beam 12. The control unit 15 may for example comprise a microprocessor or a microcontroller and be configured to receive and evaluate the individual optical signals 14. It may be provided that the control unit 15 determines the azimuthal angle 10 and an elevation angle 11 of a received radar beam 12 by means of a fusion of the optical signals 14. It may be provided that the elevation angle 11 of the radar beam 12 is determined by an evaluation of the optical signals of the radar devices 4 arranged in the antenna column 7 and the azimuthal angle 10 is determined by means of an evaluation of the optical signals 14 of the radar devices 4 in the antenna row 6. For example, the origin may be determined via a phase difference between the respectively received partial beams 12a of the radar beam at a respective radar device 4. The evaluation in the control unit 15 has a benefit that an evaluation is not required in the individual radar devices 4. Thereby, the synchronization between the individual radar devices 4 is omitted, which is usually required to provide synchronous timestamps in an evaluated signal.

Figure 2:
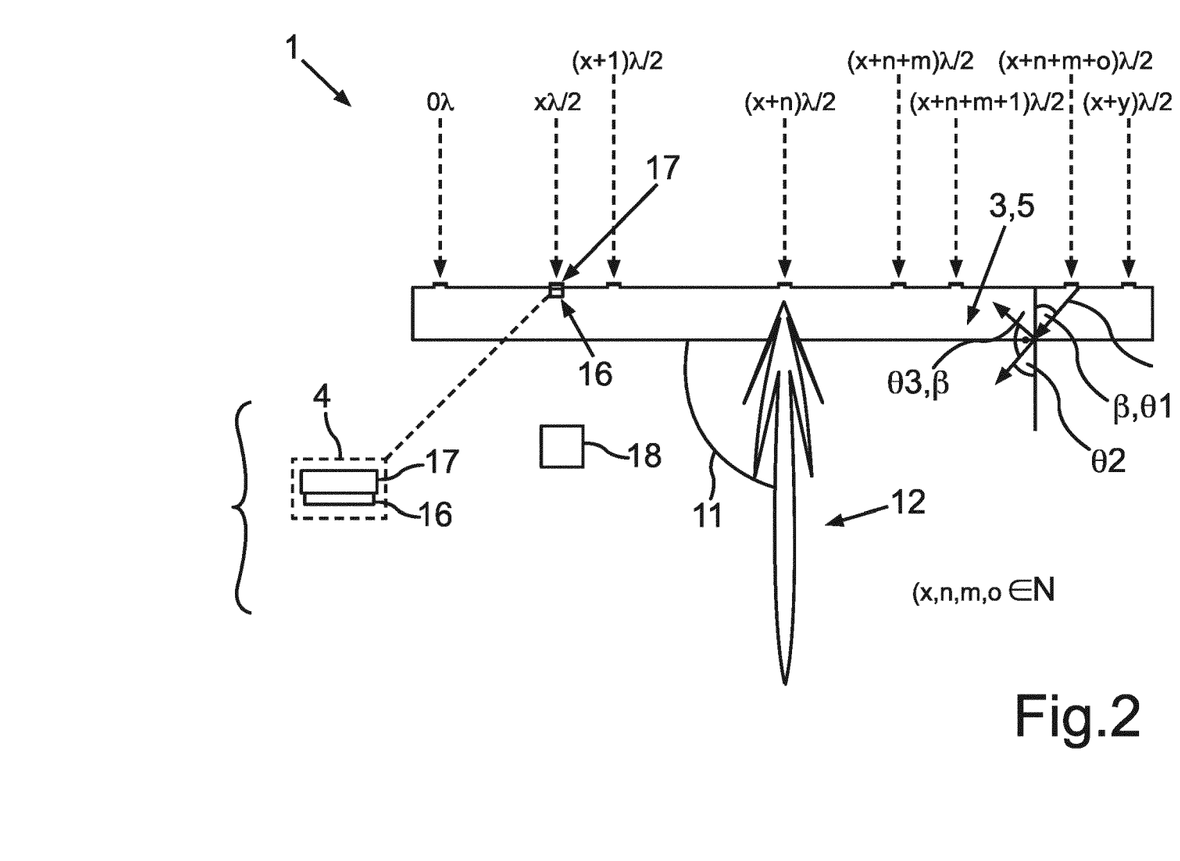
FIG. 2 shows an embodiment of an arrangement of the radar devices in an antenna row or in an antenna column of the radar antenna arrangement.

FIG. 2 shows a possible arrangement of the radar devices in an antenna row or in an antenna column of the radar antenna arrangement. The radar antenna arrangement 1 may comprise multiple of the radar devices 4, which may for example be arranged on a side of a window pane facing a vehicle interior. Therein, the radar devices 4 may each include a radar antenna 16 and a radar chip 17 for providing and/or for receiving the radar beam 12 to be transmitted. The radar devices 4 may be arranged in predetermined positions along the antenna row 6 and the antenna column 7, respectively, such that they have respective distances 8, 9 to each other, which are an integer multiple of half the wavelength A. It may be provided that the individual radar devices 4 are arranged in a so-called sparse array arrangement along the antenna row 6 and/or an antenna column 7. This means that individual positions are unoccupied such that it is not a fully occupied array of a radar antenna arrangement 1. Thereby, a benefit arises that the number of the radar devices 4 is reduced. By a predetermined arrangement, it may thus be achieved that a predetermined resolution is provided and therein the number of the radar devices 4 may be reduced. By an interference of the individual beams 12a transmitted by the individual radar devices 4, the radar beam 12 may be provided as resulting radar beams. Thus, it is an antenna array. The radar devices 4 may comprise a respective radar chip 17 and a respective radar antenna 16. The radar devices 4 may be arranged directly on a window pane. The respective individual beams 12a transmitted by the radar devices 4 penetrate the material of the vehicle component 3 and thus form a lobe characteristic to antenna arrays with a radar beam 12 in a far field of the radar antenna arrangement 1 by interferences. Via a setting of the phase positions of the respective individual beams 12a by the control unit 15, for example, the elevation angle 11 of the radar beam 12 may be set. It may be provided that one or multiple of the radar devices 4 are oriented such that they radiate their respective individual beam 12a onto an interface of the vehicle pane such that the entry angle 81 coincides with the Brewster angle $\beta$. In this case, a part of the individual beam is output at an exit angle 82 in polarized form. A remaining part may be coupled into the pane at the angle of reflection 83.

The distances 8, 9 between adjacent radar devices 4 may deviate from each other. For example, it may be provided that not each one of the distances 8, 9 is half a wavelength, but is an integer multiple of half a wavelength $\lambda$.

Figure 3:
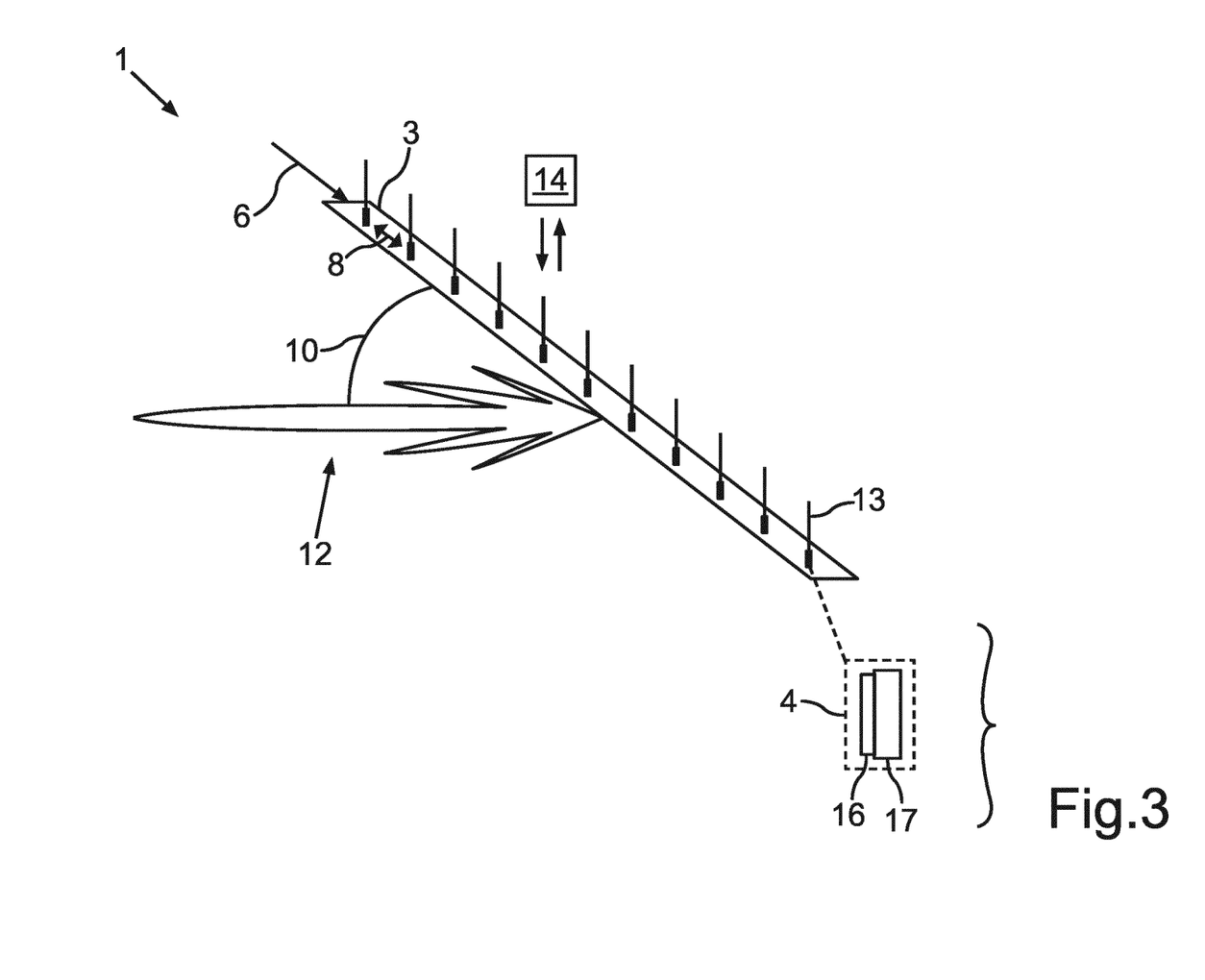
FIG. 3 shows an embodiment of the radar antenna arrangement.

FIG. 3 shows a possible embodiment of the radar antenna arrangement 1. It may be provided that the radar devices 4 may be arranged within the vehicle component 3. The radar devices 4 may be arranged in an antenna row 6 to be able to define or capture a determination of an azimuthal angle 10 of the radar beam 12. By means of a predetermined control of the respective radar devices 4 by the control unit 15 via optical signals 14, it may be provided to generate a resulting radar beam 12 with a predetermined azimuthal angle 10 via interferences. Upon reception of the radar beam, optical signals 14 may be transferred to the control unit 15 by the respective radar devices 4. From a phase position of the optical signals 14, the control unit 15 may calculate the azimuthal angle 10 of the radar beam 12. Thus, it may for example be provided that the window pane is a multilayer pane, wherein the radar devices 4 and sections of the at least one optical guide 13 may be arranged within the window pane. Thus, they may for example be arranged between two layers of the window pane. Thereby, a benefit arises that the individual radar devices 4 are fixed in their position. The individual radar devices 4 may be connected to the control unit 15 via the at least one optical guide 13. The arrangement has a benefit in that the radar devices 4 are arranged in a protected position.

Figure 4:
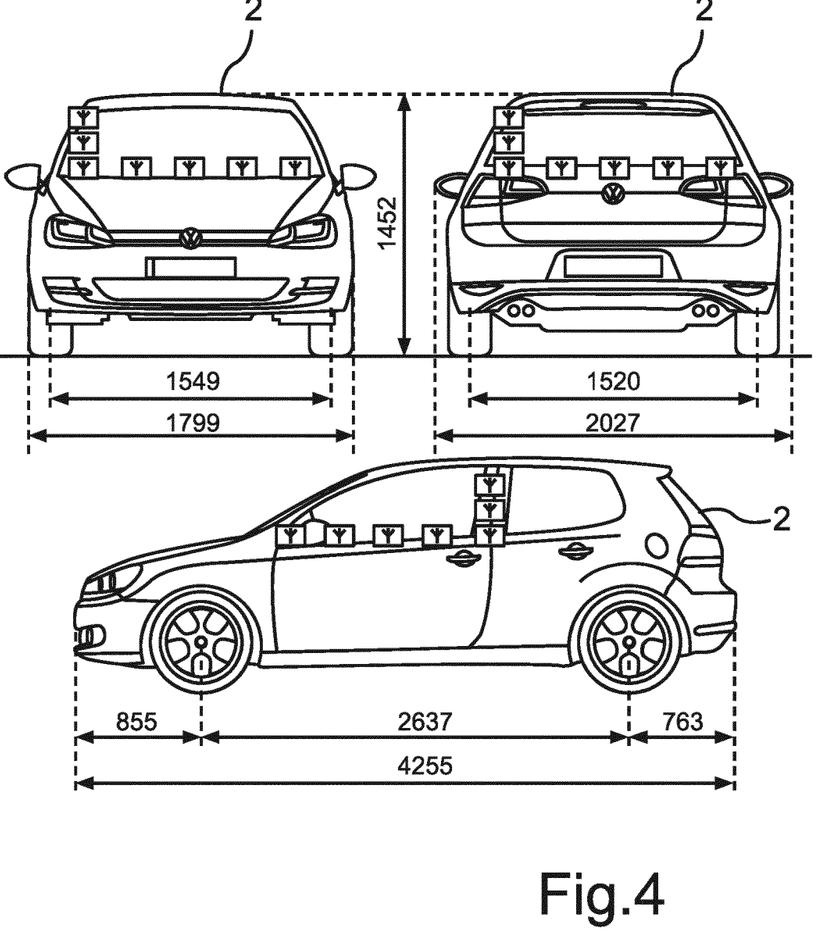
FIG. 4 shows an embodiment of a vehicle with a radar antenna arrangement.

FIG. 4 shows a possible embodiment of a vehicle with a radar antenna arrangement. It may be provided that the radar antenna arrangement 1 may be arranged on different components 5 of the vehicle 2. Then, it may for example be provided that a radar antenna arrangement 1 may be arranged on or in a front window of the vehicle and a rear window and a side window of the vehicle 2. It may also be provided that the one radar antenna arrangement 1 is for example arranged in a door or a bumper or an ABC pillar. By the use of multiple radar antenna arrangements 1 on different vehicle components 5 of the vehicle 2, a benefit arises that a 360 degree coverage may be allowed by the radar antenna arrangement 1.

Thus, the FIG. shows a vehicle 2 with multiple radar antenna arrangements 1 on different vehicle components 5. The radar antenna arrangements 1 may comprise multiple of the radar devices 4 and together constitute a radar antenna arrangement 1, which may capture an angular range of 360 degrees around the vehicle 2. For this purpose, an arrangement of the radar devices 4 may be provided on window panes of the vehicle 2 like the front, rear and/or side windows. On body components like the dampers or the fenders, radar devices 4 may also be arranged. An arrangement on A-, B-, C-pillars allows an arrangement on the vehicle without restricting the sight of the driver. An arrangement on the front window may be configured such that the at least one antenna column 7 and the at least one antenna row 6 have an angle of for example 60 to 120 degrees to each other and span a plane of an antenna array. It may also be provided that an antenna row 6 or an antenna column 7 is associated with each of the edges of the front window such that the surface of the front window is delimited by the radar devices 4. A three-dimensional capture of the environment may be achieved if a distance of objects, on which radar beams 12 are reflected, is measured.

Figure 5:
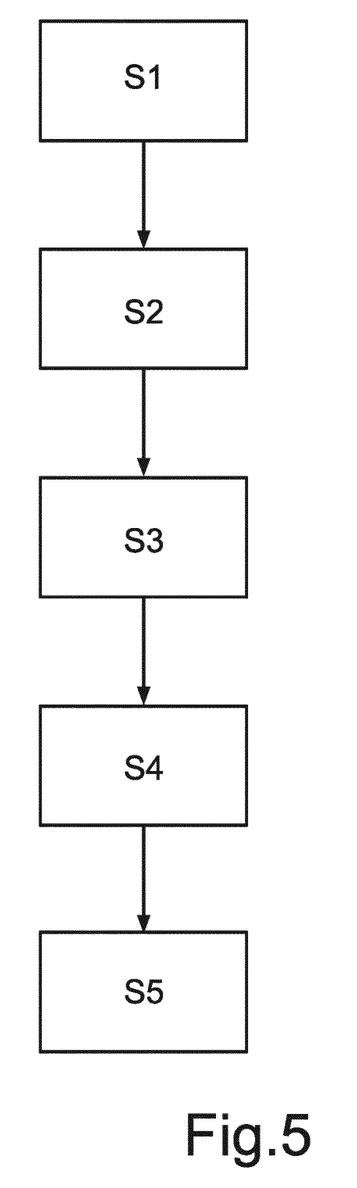
FIG. 5 shows an embodiment of a method for calibration of a radar antenna arrangement.

FIG. 5 shows a procedure of a method for calibrating a radar antenna arrangement. It may be provided that radar devices 4 of the radar antenna arrangement 1 may be arranged in a window pane as the vehicle component 5. In order to be able to determine the accurate distances 8, 9 between adjacent radar devices 4, performing the described method may be provided.

In a first step S1 of the method, the control unit 15 may transmit an optical signal 14 to the first one of the radar devices 4 via the at least one optical guide, for transmitting a partial beam 12$a$ by a first one of the radar devices 4.

In a step S2, the first one of the radar devices 4 may receive the optical signal 14 and transmit the partial beam 12$a$ into the window pane.

In a step S3, the partial beam 12$a$ may impinge on an interface of the window pane to the air and be partially reflected such that a part of the partial beam 12$a$ is radiated back into the window pane. The partial beam 12$a$ radiated back may impinge on a further interface between the pane and the air and partially be again reflected back into the pane. Thereby, it is possible that the partial beam 12$a$ propagates within the window pane.

In a step S4, the partial beam 12$a$ may be captured by a second one of the radar devices 4. Thereupon, the second one of the radar devices may transmit an optical signal 14 to the control unit 15 via the at least one optical guide 13.

In a step S5, the control unit 15 may receive the optical signal 14 and determine the distance 8, 9 between the first one and the second one of the radar devices 4 for example from a time interval between the transmission of the optical signal 14 for radiating the partial beam 12$a$ and the reception of the optical signal of the second one of the radar devices 4 or via a phase difference.

For automatically driving, environmental capture as secure as possible is indispensable. Therein, the environment is captured with the aid of sensors like radar, lidar and camera. An integral 360 degree 3D capture of the environment is particularly important such that all of the static and dynamic objects are captured. In particular, a leading part is accrued to the lidar in the redundant, robust environmental capture since this sensor type may precisely measure distances in the environmental capture and may also be employed for classification. However, these sensors are cost-intensive and expensive in their construction. In particular the 360 degree 3D environmental capture is problematic since either many smaller individual sensors are required to ensure it, which usually operate with many individual light sources and detector elements, or large sensors are installed. However, the smaller sensor types are also still in the range of 10 cm×10 cm×10 cm in their spatial dimensions and do not allow a visible installation position up to now. Furthermore, the measurement data individually collected by each sensor has to be individually processed and/or fused. Therein, the accurate time stamping is in particular important for the real-time processing, which additionally makes the data capture and classification expensive. In the area of the passive safety systems as well as for automatically driving at level four and five, the discriminability of the traffic participants is of particular importance both for the protection of the occupants and of the traffic participants. Thereto, the secure environmental capture is indispensable. In order to guarantee this, the environment has to be perceived with a resolution as high as possible in all of the three spatial dimensions. Modern camera and LIDAR systems are capable of ensuring this environmental capture, but are affected in their quality or completely fail in poor visibility conditions like fog, snow or in darkness. In contrast, radar sensors are not subject to these limitations, but have to be arranged in an array arrangement with a plurality of different sensors for 3D imaging with high resolution. Moreover, they have to be synchronized with respect to their transmission and reception time, which is technically extremely challenging. Therefore, it is beneficial if the individual radar sensors are as small, simple, flexible, error-tolerant, robust and inexpensive as possible. For this purpose, as little electronics as possible has to be installed on the radar sensor itself, and the digital data processing has to occur in decentralized manner within a central control unit. Conventional radar systems in series production have an angle separability in azimuth of 10 degrees to 4 degrees. The angular separability in elevation is usually even lower such that imaging methods cannot be used for radar data. The angular separability of current LiDAR systems is in the range of 0.1 degrees, which cannot be achieved with current radar systems.

Current radar sensors, which are installed in the car, mostly have dimensions of 10×10 cm. The maximum angular resolution achieved thereby is ca. 2 degrees and only allows 2D environmental capture. The current radar sensors have too large spatial dimensions with small aperture for vehicles, from which a too low resolution power results. It does not allow sufficient environmental capture for autonomously driving. The installation of multiple sensors requires the temporal synchronization thereof, which is technically challenging and cost-intensive. Nanoradars have dimensions in the range of 5×5 cm and may be easier integrated in the vehicle by their compact construction. Nanoradars have the same disadvantages. Moreover, the range of the nanoradars is currently limited to 45 m, which is too low in particular for intraurban scenarios. The resolution power may be increased up to the cm range by means of the synthetic aperture method (English: "Synthetic Aperture Radar", SAR). The SAR method is only possible perpendicular to the direction of travel. A foresight into or opposite to the direction of travel is not possible with this method. In addition, the data processing required after the measurement is very computationally intensive.

The installation of many electronic components within the sensors increases the spatial dimensions and costs thereof such that the use of multiple sensors is not implementable. Moreover, the temporal synchronization of the sensors is technically challenging. If the aperture is to occur by distribution of the antennas and subsequent decentral digital data processing within a central control unit, however, the electrical transfer of the transmit and receive signal is problematic since the losses would be several dB.

Furthermore, it is required to use multiple individual sensors. Large spatial dimensions of the sensors do not allow a concealed installation on a vehicle such that they remain visible. By the use of multiple individual sensors, a relatively high effort for synchronization of the individual sensors is required. In addition, the data fusion is expensive and prone to error since a central data capture is not effected, but each individual sensor itself captures and forwards the measurement data. High costs result from it.

The radar antenna arrangement utilizes photonically integrated radar chips as the radar devices to span a large radar array. The radar devices are connected to the control unit via the at least one optical guide at least in sections. The control unit comprises a central optical transmitting unit, which is formed to provide an optical radar driver signal and to couple it into the at least one optical guide. The radar devices comprise a respective optical receiving unit and a radar transmitter, wherein the optical receiving unit is formed to receive the optical radar driver signal via the at least one optical guide and to convert it into an electrical radar driver signal and to provide it for driving the radar transmitter. The radar devices comprise a radar receiver, a mixer and an optical modulation unit, wherein the mixer is formed to mix a radar echo signal received by the radar receiver with the electrical radar driver signal, and wherein the modulation unit is formed to modulate the mixed signal onto the optical radar driver signal and to couple it into the at least one optical guide. The central unit further includes a central optical receiving unit and an evaluation unit, wherein the evaluation unit is formed to evaluate the modulated signal received from the central optical receiving unit and to output radar information derived from it.

A basic idea is in optically realizing a signal transfer between a central unit and a radar transmitting unit and a radar receiving unit, respectively. Hereto, a radar driver signal is optically generated in the central unit and transferred to at least one radar receiving unit and/or at least one radar transmitting unit via at least one glass fiber. The optical radar driver signal is then converted into an electrical radar driver signal in the radar transmitting unit and used for driving a radar transmitter. A radar echo signal received by a radar receiver is mixed with the electrical radar driver signal in a mixer of the radar receiving unit. The mixed signal is subsequently modulated onto the optical driver signal by means of a modulation unit, coupled into the glass fiber and communicated back to the central unit. The modulated optical signal is received in the central unit and evaluated by means of an evaluation unit. Subsequently, the result is provided as radar information. A benefit is that a co-integration of optical and electrical components is effected for generating and for receiving a radar echo signal. The generation of the radar driver signal is effected optically and centrally in the central unit, the transfer to a radar transmitting unit and to a radar receiving unit, respectively, is also optically effected. Herein, the attenuation of a signal lower by orders of magnitude may be used in the transfer via a glass fiber in contrast to an electrical transfer. The lower attenuation allows collectively supplying a great number of radar transmitting units and radar receiving units with a radar driver signal. Moreover, glass fibers have a considerably lower weight than corresponding electrical lines and are less sensitive to external interferences such as for example electromagnetic fields.

A further benefit of the central optical generation of the radar driver signal is in that the radar transmitting units and the radar receiving units may be produced and provided in compact construction with small dimensions. Hereby, installation space and costs are saved. The complexity of the radar system is in the central unit and no longer in the individual radar transmitting unit and the individual radar receiving unit, respectively, in the solution of the teachings herein. Hereby, the individual radar transmitting units and radar receiving units may be simply and inexpensively produced and simply and fast exchanged in case of a defect.

The radar antenna arrangement allows the concealed installation of the individual radar chips behind or in the front window, the A-, B-, C-pillar, fender, bumper or similar structures. An installation within the windscreen is beneficial since it has required stiffness and thus positional variations of the individual antenna elements among each other by vibrations or the like are low compared to the bumper.

Therein, the radar chips with antenna may either be directly attached on the inner side of the windscreen (driver's cabin) or the radar chips may be directly integrated in the pane material. In both cases, the emission of the radiation is effected to the outside. By the large-area arrangement of the radar chips, large apertures may be spanned such that angular separabilities of 0.1 degrees and below may be achieved. Thus, image processing algorithms may be used for radar data.

The reflections of the Tx radar chips at the transition of pane-air may be minimized by an orientation of the radar antennas for the purpose of radiation at the Brewster angle. The same applies to the Rx channels. At the same time, the p-polarized portion of the radar radiation could be suppressed. The residual radiation coupled into the pane may be used for the calibration of the individual chips in that e.g. the relative position of the chips to each other is ascertained. The antennas of the array do not necessarily have to be arranged at the distance of integer multiples of half the wavelength (fully occupied array), but may also contain gaps with skillful choice of the antenna position. This sparse array approach allows only slightly changing the beam characteristic such that a high angular separability down to 0.1 degrees may still be uniquely achieved. For optically contacting the radar chips with the optical carrier signal, waveguides may be directly integrated in the pane.

The installation of individual radar chips, which form a large overall aperture, allows a resolution power comparable to LiDAR. By a sparse array configuration, the data amount to be processed may be reduced without significantly restricting the resolution. Due to the low dimensions of the radar devices, an arrangement of the radar devices in concealed positions is possible such that they are not visible from the outside or inside. An integration in or behind panes is possible, also in black print. An integration in ABC pillars or in the front spoiler is possible. The possibility of directly applying image processing algorithms to radar data in the control unit arises. By an arrangement of radar devices in a plurality of different components of the vehicle, a coverage of a large visual range with a high resolution power is possible, which is comparable to that of lidar. In addition, in window panes, the possibility of directly integrating optical waveguides for a connection of the radar devices to the control unit arises. In an arrangement of the radar devices in a window pane, the possibility of using the residual beams coupled into the pane for calibration of the individual chips arises.

Opposite to known methods, the described radar antenna arrangement is inexpensive because sophisticated and established technologies are employed in the production, which are available in mass production. In addition, it has a relatively simple construction. The sparse array arrangement allows a reduction of the number of individual sensors. The use of portions of the radar beams, which are coupled into a window pane, allows a simple calibration of the radar antenna arrangement 1. The optical coupling allows a simple synchronization of the individual antenna units. There is the possibility of directly applying image processing algorithms to radar data. All radar applications, thus, e.g., also in securing manufacturing robots. Overall, the example shows how a possibility of arrangement of radar devices on a vehicle is provided by the teachings herein.

LIST OF REFERENCE NUMERALS

1 Radar antenna arrangement
2 Vehicle
3 Vehicle component
4 Radar device
5 Component surface
6 Antenna row
7 Antenna column
8 Horizontal distance 9 Vertical distance
10 Azimuthal angle
11 Elevation angle
12 Radar beam
12a Individual beam
13 Optical guide
14 Optical signal
15 Control unit
16 Radar antenna
17 Radar chip
S1-S5 Calibration steps
α Angle between antenna row and antenna column
λ Wavelength
β Brewster angle
θ1 Angle of incidence
θ2 Exit angle
θ3 Angle of reflection The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "serving as an example, instance, or exemplification".

The mere fact that certain measures are recited in mutually different dependent claims or embodiments does not indicate that a combination of these measures cannot be used to advantage. Any reference signs in the claims should not be construed as limiting the scope.

What is claimed is:

1. A radar antenna arrangement for a vehicle comprising at least one vehicle component, wherein
    the radar antenna arrangement comprises multiple radar devices configured for one or more of transmitting and receiving a radar beam;
    the radar devices are arranged in an antenna array, which antenna array has at least one antenna row of radar devices for determining an azimuthal angle of the radar beam and at least one antenna column of radar devices for determining an elevation angle of the radar beam;
    the antenna array is arranged on a vehicle component, the vehicle component comprising a windowpane;
    the at least one antenna row and the at least one antenna column include an angle α of 5 degrees to 180 degrees;
    the radar antenna arrangement comprises at least one optical guide;
    the radar devices are connected to a control unit of the radar antenna arrangement via the at least one optical guide;
    the optical guide is configured to transfer optical signals between the control unit and the radar devices; and wherein
    the at least one optical guide configured to transfer optical signals between the control unit and the radar devices is at least partially embedded in the windowpane.

2. The radar antenna arrangement of claim 1, wherein the at least one antenna row and the at least one antenna column include an angle α of 60 degrees to 120 degrees.

3. The radar antenna arrangement of claim 2, wherein the respective horizontal distances and the respective vertical distances of the radar devices are integer multiples of a predetermined radar wavelength λ, wherein the radar wavelength λ is between 0.011 m and 0.014 m or 0.0037 to 0.0038 m.

4. The radar antenna arrangement of claim 2, wherein the radar devices are arranged in a sparse array arrangement.

5. The radar antenna arrangement of claim 2, wherein the vehicle component comprises one or more of an A-pillar, a B-pillar, and a C-pillar.

6. The radar antenna arrangement of claim 1, wherein the respective horizontal distances and the respective vertical distances of the radar devices are integer multiples of a predetermined radar wavelength λ, wherein the radar wavelength λ is between 0.011 m and 0.014 m or 0.0037 to 0.0038 m.

7. The radar antenna arrangement of claim 6, wherein the radar devices are arranged in a sparse array arrangement.

8. The radar antenna arrangement of claim 1, wherein the radar devices are arranged in a sparse array arrangement.

9. The radar antenna arrangement of claim 1, wherein the vehicle component comprises one or more of an A-pillar, a B-pillar, and a C-pillar.

10. The radar antenna arrangement of claim 1, wherein the vehicle component comprises a body component.

11. The radar antenna arrangement of claim 1, wherein the radar devices are arranged in the window-pane.

12. The radar antenna arrangement of claim 1, wherein a principal radiation direction of at least one of the radar devices is oriented to an outer surface of the window pane at a Brewster angle β.

13. A method for calibrating a radar antenna arrangement of claim 1, wherein
    a first one of the radar devices is controlled for emitting a predetermined partial beam using an optical signal by the control unit;
    the predetermined partial beam is transmitted by the first one of the radar devices;
    at least a part of the partial beam is reflected within the pane and received by a second one of the radar devices;
    an optical signal is transferred from the second one of the radar devices to the control unit;
    a distance between the first one and the second one of the radar devices is determined by the control unit.

14. A vehicle comprising at least one radar antenna arrangement of claim 1.

* * * * *

UNITED STATES PATENT AND TRADEMARK OFFICE
CERTIFICATE OF CORRECTION

PATENT NO. : 12,212,049 B2  
APPLICATION NO. : 17/616611  
DATED : January 28, 2025  
INVENTOR(S) : Kurz et al.

Page 1 of 1

It is certified that error appears in the above-identified patent and that said Letters Patent is hereby corrected as shown below:

On the Title Page

Item (73) Assignee, Please change "Volkswagen Aktiengesellschaft Wolfsburg (DE) AUDI AG Ingolstaft (DE) Sicoya GmbH Berlin (DE)" to --Volkswagen Aktiengesellschaft Wolfsburg (DE) AUDI AG Ingolstaft (DE)--.

Signed and Sealed this  
First Day of July, 2025

Coke Morgan Stewart  
*Acting Director of the United States Patent and Trademark Office*